May 5, 1925.  1,536,723

F. G. NEAL ET AL

METHOD OF MAKING TIRES

Filed Oct. 16, 1922  3 Sheets-Sheet 1

INVENTOR
Franklin G. Neal
David F. Logan
BY
Edward C. Taylor
ATTORNEY

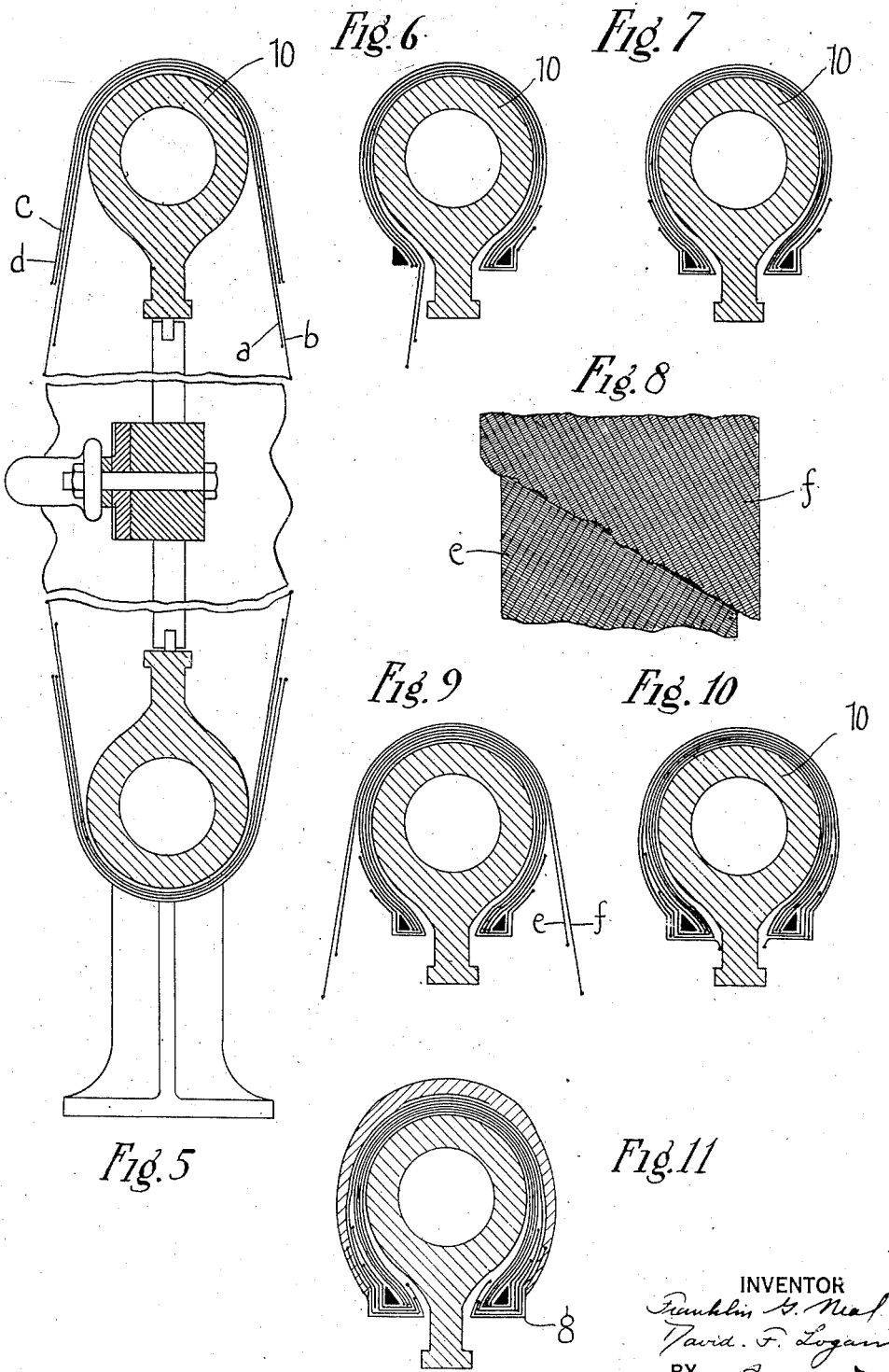

May 5, 1925. 1,536,723

F. G. NEAL ET AL

METHOD OF MAKING TIRES

Filed Oct. 16, 1922 3 Sheets-Sheet 3

INVENTOR
Franklin G. Neal
David F. Logan
BY Edward C. Taylor
ATTORNEY

Patented May 5, 1925.

1,536,723

UNITED STATES PATENT OFFICE.

FRANKLIN G. NEAL, OF SPRINGFIELD, AND DAVID F. LOGAN, OF CHICOPEE FALLS, MASSACHUSETTS, ASSIGNORS TO THE FISK RUBBER COMPANY, OF CHICOPEE FALLS, MASSACHUSETTS, A CORPORATION OF MASSACHUSETTS.

METHOD OF MAKING TIRES.

Application filed October 16, 1922. Serial No. 594,755.

*To all whom it may concern:*

Be it known that we, FRANKLIN G. NEAL, residing at Springfield, county of Hampden, State of Massachusetts, and DAVID F. LOGAN, residing at Chicopee Falls, county of Hampden, State of Massachusetts, have invented certain new and useful Improvements in Methods of Making Tires, of which we declare the following to be a full, clear, and exact description.

This invention relates to a method of tire building. It has peculiar advantages in the building of cord tires by the endless band or so-called pocket method. Its principal advantages are in the speed and simplicity of the operations, in the character of stretch given to the cord bands, in the way the bands are positioned on the building core, and in combination of certain operating steps to build even very large tires with convenience.

The general object of the invention is to improve the method of building tires. The general and specific objects will be better understood from a detailed description of the method according to one of its practical applications in use.

The invention is illustrated and described in one of the preferred forms in which it may be used.

Fig. 5 is a sectional view of a collapsible tire building core or form with the four-ply band on it and mounted on a chuck, all conveniently supported in building position.

Fig. 6 is a cross sectional view through the core with the beads applied at the sides of the band as the latter is conformed to the core.

Fig. 7 is a view like Fig. 6 but with the edges of the two inside plies turned or folded under and around the beads; the ends of each ply are arbitrarily represented by large dots to show their position. This plan is also carried out in the other figures.

Fig. 8 illustrates a portion of a two-ply band or pocket with sections removed to show the construction and arrangement of the layers.

Fig. 9 is a view like Fig. 7 but with the two-ply band indicated in Fig. 8 applied to the core.

Fig. 10 is a view like Fig. 9 but with the edges of the two-ply band applied over and under the beads.

Fig. 11 is a view like Fig. 10 but with the covering rubber in position over the carcass.

The drawings are not made to an exact scale but for the purpose of better illustrating the method they are substantially to scale and based on the building of a commercial 31 x 3 cord tire.

The strain resisting members are of the usual present day cord type made up into rubberized sheet form with light wefted threads to hold the cords during some of their handling operations through the rubberizing operations. These cords, as usual, are built into sheet form with layers of protecting rubber.

Figure 1:
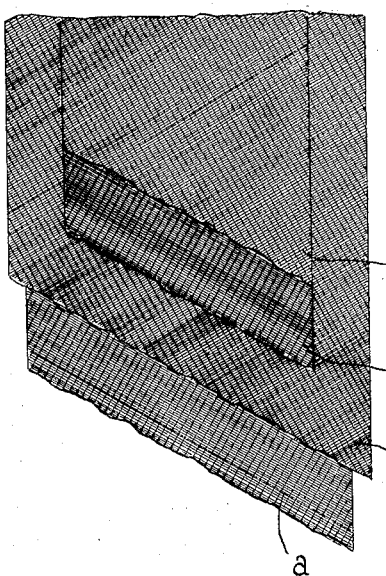
Fig. 1 illustrates a portion of a four-ply band or pocket with sections of the plies removed to show the laminated construction and arrangement of the cord layers.

In the illustrated embodiment of the invention the rubberized cord is laminated in flat and endless band form. The cords in one ply preferably cross the cords of an adjacent ply and the cords are arranged at an acute angle shown in this instance as 30° to the edges of the band. Such a band consisting of four plies is illustrated in Fig. 1. Its diameter is approximately that of the bead line or edge of the finished tire. The number of cords per inch, measured at right angles to the cord length, is that number desired at the bead edge, and the angle of the cords to the edge of the band is such that the stretch of the band at the center from the bead diameter to the tire crown diameter will result in the number of cords per inch at the crown as desired. These are controlling factors, as will be recognized by the tire builder, because a change of angle will give a change in cord number per inch from the bead line as a starting point to the crown of the tire as an end point. Wide variations in tire structure, building operations, and strength, will result from the chosen number of cords per inch at the bead line, the angle of the cords from bead to bead and the character of stretch given to a band of this character.

Figure 2:
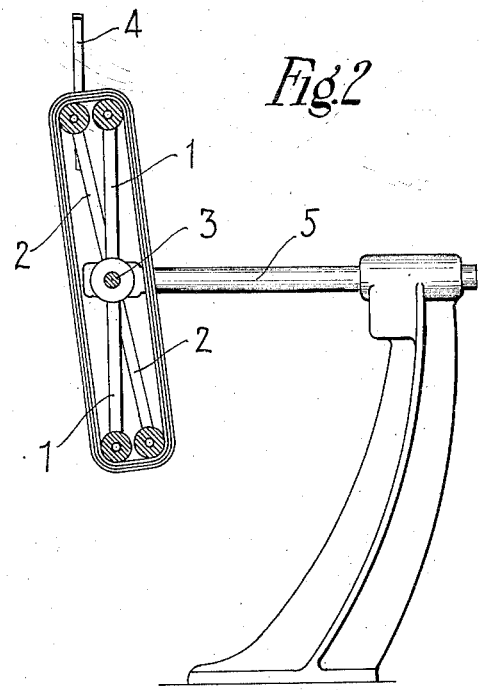
Fig. 2 is a sectional view on line 2—2 of Fig. 3 of the band stretching apparatus with the cord band in place before the principal stretching operation.

The band of Fig. 1 is placed over the rolls of the stretcher shown in Fig. 2, with the arms 1 and 2 in collapsed position. The perimeter measurement around the four corners or rolls of the stretcher in collapsed position shown in Fig. 2 is substantially that of the unstretched band or at least such that the band can be conveniently applied to the stretcher. The band preferably fits on the rolls with a snug fit when applied by hand to the position of Fig. 2. The arms 1 are fixed to shaft 3 supported by the stand 5, but arms 2 are pivoted for rotation about the shaft. It is convenient to have an extension 4 as a handle on arms 2. A preferred form of apparatus or tool for stretching is claimed in co-pending applications Serial Nos. 597,260 and 693,937, filed October 27, 1922, and February 19, 1924, respectively.

With the band of Fig. 1 placed on the stretcher in collapsed position shown in Fig. 2, the operator conveniently grasps the handle 4 attached to one of the arms 2 and rotates these arms through a small arc which gives a preliminary stretch to the band. By swinging the arms 2 back and forth the band will gradually stretch even though it consists of four or more plies as $a$, $b$, $c$, and $d$, of regular cord fabric, without more power being applied than can be readily exerted by the ordinary tire builder with the leverage disclosed in the apparatus. By repeated movements of the arms 2 the band is quickly stretched to the position indicated in Fig. 4 when it is at its maximum stretch so far as this stretching apparatus is concerned. When the band has reached this position it is preferable for the operator to swing the arms 2 down and back, describing an arc of substantially 180°, which action will distribute the band around the four rolls shown and in this manner distribute the stretch to the band so that it will not be unduly stretched at any localized point or points. As the band is stretched, it moves and is preferably caused to move to a substantial amount over the rolls. These rolls are mounted in bearings at the outer ends of arms 1 and arms 2, all as shown in the drawing.

The advantage in giving this character of stretch to the band lies in the fact that as the band moves around the stretching apparatus or more specifically over the rolls, there are no permanent contact portions on the band, between which portions the stretching force is exerted. Therefore the force exerted on the band suspended between shifting contact portions stretches all portions more evenly. If it were not for the shifting of the band on the stretcher, the contact portions being restricted would cause uneven stretching. Since the rolls and band move one relatively to the other particularly when the operator, as described, stretches the band in small increments to begin with, and then with a sweeping movement to cause a large relative movement between the rolls and band, the stretch is substantially distributed over the entire circumference or perimeter of the band. The specific stretching operation is by way of example only as different apparatus will give the same result in a different way. The time taken in this stretching operation is preferably very short—a matter of a few seconds. For purposes of the illustrated case it is well inside of one minute.

When the band is thus stretched, the stretcher is collapsed to the position of Fig 2. All portions of the band are thus simultaneously released from the stretching force. The band immediately after stretching is removed from the stretcher, and without delay placed over the core 10 of Fig. 5. It will be understood that the band thus placed over the core of Fig. 5 may be applied to the core by hand within a few seconds. This is so because the stretcher has expanded the band from substantially the diameter of the finished tire at the bead to the diameter of the finished carcass at the crown, which substantially corresponds to the crown diameter of the core. We prefer to stretch the band to a diameter a little less, rather than a little more, than the crown diameter. In any event, it should be stretched so as to make the application to the core possible by hand. The diameter of the band is referred to as if the band were circular. The fact is, however, that the band is not circular until placed on the core.

The transfer of the band from the stretching apparatus to the core is particularly important. The important feature involved is in the method by which the band is stretched in a substantially uniform manner and then transferred and centralized on the core before the band has time enough to shrink to an extent sufficient to interfere with the hand operation desired. The material of the band as described is such that it will contract on the core and will do so with a high degree of uniformity, particularly if not stretched too much and if the time between stretching and application to the core is not too long.

The rubberized cord band described is made to stretch without distortion. The stretch given will break the weak weft threads of the ordinary cord fabric, and leave the strong warp cords free, which is what is intended. The rubber connecting the warp cords is unvulcanized. Therefore if the band is stretched quickly, released, then centralized on the core without delay, and finally given time to contract, it will do so very nicely and uniformly. In the transfer from the stretcher to the core there is nothing positively holding the band in stretched condition, that is to say the stretching force is released. It is clear therefore that the time element is important. It is a fact that the band will, when released, start to contract but there is time, as we have found from actual practice, to make the transfer even with the band free. As the band is being centralized on the preferably rigid core as in Fig. 5, it continues to contract as it started to do when first released from the stretcher. The crown, however, cannot contract when centered over the crown of the core. The operator can continue his work without waiting, because as he centers the band and core, the edges are contracting all the time. When the operator is ready, the contracted skirts of the band are in position for the bead application. We believe that the handling steps from the stretcher to the core assist in avoiding any uneven or local strains in the band. By treating the band in flat form (as to cross section) during the stretching operation, releasing it simultaneously and completely, then holding it to carcass crown diameter at the center only, and finally leaving it alone to contract as it will, we believe special benefits are attained, particularly in the uniform character of the stretch and lay of the cord. The simplicity of the operations for tire building will be apparent.

According to this invention as described, we have found that the operator can stretch even a heavy band in the way illustrated, release the band, apply it by hand without any substantial difficulty to the core of Fig. 5, and centralize it without the use of any applying or stretching tools at the core. The band of four plies appears to lend itself to the objects desired even better than a two ply band. By this method it is possible to build a cord tire with remarkable ease by what is known as the "single stretch system", which system involves a sufficient stretch of the plies from their original unstretched condition so that in their application to the core the plies will shrink on the core and substantially conform to the core from the crown diameter to the bead diameter of the tire to be built.

When the band has been applied as indicated in Fig. 5, which figure illustrates the band after it has had time to contract about the core, the operator places the beads first on one and then on the other side of the band, and by moving the bead or endless ring constituting the bead filler axially of the core, the cords of the band on each side readily move inwardly from the position indicated in Fig. 5 to that indicated in Fig. 6. This operation the workman has no difficulty in performing, as the edges of the outer two plies of the band may indicate the position for the toe of the bead, or other bead positioning means may be used. If he places the toe of the bead at the edges of these plies and then works the bead inwardly by hand against the core and progressively around the core, he will apply the band smoothly to the core with a cross section as indicated in Fig. 6, and this without any stitching operation whatever.

The edge portions of the inner two plies a and b, as indicated in Fig. 1 as well as Fig. 6, are wider than the outer two plies c and d and therefore when conformed to the core extend inwardly and below the bead. The operator folds these edges under and over the bead so that they overlap the other two plies as indicated in Fig. 7. This is called the "bead tie-in". The particular character of this "tie-in" chosen for the purposes of illustration is not the only one which a tire builder may choose to use, as this particular feature may be varied according to the tire builder's preference. The drawings show one practical method of applying the beads at the open edges of the carcass.

Figures 3, 4:
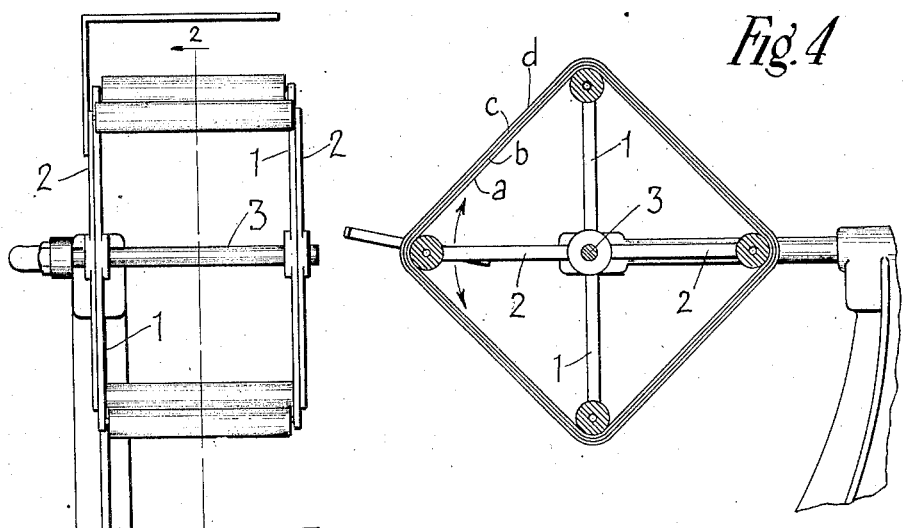
Fig. 3 is a front view of the stretching apparatus without the cord band on it.
Fig. 4 is a view like Fig. 2 but with the apparatus in expanded position and with the cord band in place after the principal stretching operation.
Figure 12:
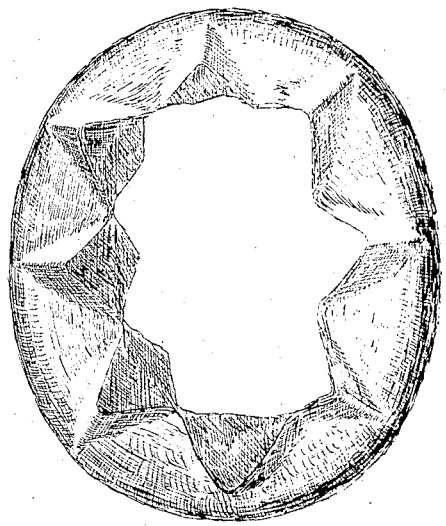
Fig. 12 is a perspective view to illustrate the position or condition of the cord band of four or two plies after it has been stretched on the apparatus of Figs. 2, 3, and 4, centralized over the core, and released for contraction as indicated in Figs. 5 and 9.

After the four-ply band has been applied to the core as described, the two-ply band of Fig. 8 is stretched on the apparatus of Figs. 2, 3, and 4 in the same manner as the four-ply band, and the two-ply band is then placed upon the core and thus superimposed upon the four-ply band already on the core, so that it occupies the position generally indicated in Fig. 9. The operator may find in the application of this second band that the use of a liner placed around the four-ply band and pulled out after the application of the two-ply band will be convenient, but such use is not necessary, as the two-ply band can be centered on the core as indicated in Fig. 9 without any other assistance than the operator's hand work. Due to the fact that the core indicated has a reverse curve at the regions immediately adjacent the bead line, and due to the fact that the plies in their application to the core under this method are not stitched down to the core but are only caused to contract to conform to the core, the edges of the carcass adjacent the bead line of the core do not fit tightly, as will be apparent from the illustrations and Figs. 6, 7, 9, 10, and 11. This fact is an advantage, as will be pointed out later. The width of the last two-ply band and each ply thereof is illustrated in Fig. 9. With the band in this position, the operator takes a hand roller, preferably one with a concave working face, and rolls the two-ply band down against the four-ply band and then folds the edges under the bead. The edge portions of ply e are folded inside the bead edges when the side walls and chafing strip are applied. All this work can be done by hand without assistance of any power, as the parts are all placed in condition for easy application by the stretching operations.

The carcass finished in the manner indicated in Fig. 10 is then covered by the usual finishing operations including the application of rubber tread, breaker, sidewalls, and chafing strip, all indicated in Fig. 11. At the same time that the chafing strip is folded inside the tire, the edge portions of ply e are likewise folded as indicated in Fig. 11. This work is rendered much easier due to the fact that the carcass does not fit the core tightly at the bead edges.

Figure 13:
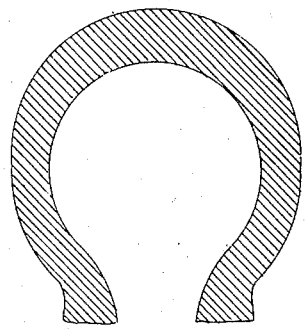
Fig. 13 is a conventional cross section of a tire finished as in Fig. 11 and ready for vulcanization.

As indicated in Fig. 5, the core upon which the tire is built is preferably mounted on a chuck operable (for example like the core of De Mattia Patent 1,323,164) to pull the sections of the core out of the interior of the carcass so that the carcass may be readily removed from the core. The finished carcass then has the general cross section outline of Fig. 13 and is ready for vulcanizing.

Figure 14:
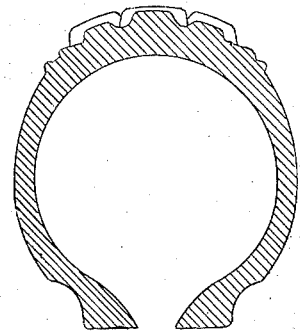
Fig. 14 is a view of the same tire after it is vulcanized in a mold and expanded to the mold by internal expanding pressure.

The vulcanizing step preferred and important to this particular method is that of internal expansion against the interior of a closed mold. This way of curing cord tires is well understood, and ordinarily includes the insertion of an air bag in the carcass, the placing of the carcass and air bag in the inside of a mold which is then closed and heated while the air bag is kept under pressure during vulcanization. The carcass, due to the internal pressure of the air bag, is expanded from the outline of Fig. 13 to the outline of Fig. 14 as illustrated, during which time the non-skid design may be placed by the molding surface on the covering rubber or tread portions.

This increase in size in the vulcanizing step from the carcass as built to the carcass as cured, causes the parts above the bead to be stretched under and by fluid pressure and all parts to be all pressed into a homogeneous unit due to the pressure of the air bag towards the mold with the tire between. The increase in size of the carcass and the compacting pressure during the vulcanizing step causes an accurate movement of the carcass materials to the desired tire shape determined by the mold. The carcass materials are assembled on the core in the building operations by hand without the necessary use of any power tools to compact the materials of the carcass in any manner analogous to the compacting of said materials in the stitching operations by machinery. This so-called loose assembly is believed to be of considerable advantage because of the freedom from distorting strains when the carcass is forced under fluid pressure from the size represented by Fig. 13 to that size represented by Fig. 14. The fluid pressure causing this increase in size is more than sufficient to compact the parts of the assembled carcass materials and is applied when these materials are forced to their ultimate positions in the tire.

Many variations may be made from the details of the method herein described and illustrated as one preferred form. For example, a skilled tire builder or designer will make the number, arrangement, and type of his strain resisting cords what he wants. He will vary the bead "tie-in" at the band edges to conform to his own ideas. He may choose to stretch and apply all of the carcass bands or laminations at one time instead of splitting the operation between the plies under the bead and the plies over the bead as now shown in the illustration. The tread and sidewalls may be stretched and applied simultaneously or separately with respect to the band of carcass cords. Of course a clincher type bead filler may be used instead of the inextensible or straight side type shown. These are only some of the variations which may be made within the spirit and scope of the claims as they particularly point out the invention.

Having thus described our invention, we claim:

1. In a method of tire building, the steps of stretching an endless band of carcass material in substantially flat form on a stretcher, completely releasing the band for a short interval of self-adjustment, and then applying the loose band to a tire shaping former.

2. In a method of tire building, the steps of stretching an endless band of carcass laminations in substantially flat form on a stretcher from the bead to the crown circumference of an uncured carcass, completely releasing the band for a short interval of self-adjustment, and then applying the loose band to a tire shaping former before it has contracted a substantial amount.

3. In a method of tire building, the steps of stretching an endless band in substantially flat cross section by successively applying oppositely acting forces at different portions of the band as it is being expanded, completely releasing the band for self-adjustment to its stretched condition, and then centering it on a tire shaping former before it has had time to contract a substantial amount.

4. In a method of tire building, the steps of stretching an endless band of carcass material in substantially flat cross sectional shape, completely releasing the band from the stretching force for a short interval of self-adjustment and then applying the band to a tire building former for shaping by the contraction of the stretched band on the former.

5. In a method of tire building, the steps of uniformly stretching an endless substantially flat band of carcass material on a stretcher, completely releasing the band, and then applying the loose band while still in stretched condition to a tire shaping former, the time interval between the release of the band and its application to the former being less than that required for the band to contract substantially from its stretched condition but sufficient to permit it to adjust itself.

6. In a method of tire building, the steps of stretching an endless band of carcass material in substantially flat form by successively applying oppositely acting forces at different portions of the band as it is being expanded, and then applying said stretched band to a tire shaping former after it has been released from said forces for a short period of readjustment.

7. In a method of tire building, the steps of circumferentially stretching an endless band of carcass material along both edges and the portions therebetween on a stretcher, releasing the band from the stretcher, permitting the band to readjust itself while loose, and then centering the band over a tire shaping former before it has had time to contract a substantial amount below the size of said tire shaping former.

8. In a method of tire building, the steps of stretching an endless band on a stretcher until it has a given diameter, completely releasing the band from the stretcher for a period of readjustment while loose and in substantially flat form, and thereafter transferring and applying it to a tire shaping former of substantially the same diameter before the band has shrunk in its loose condition a substantial amount below said diameter.

9. The method of building tires which consists in building the carcass material in multi-ply substantially flat bands of a diameter approximately equal to the bead diameter of the tire, stretching said bands while in flat cross sectional form to a diameter at least equal to the crown diameter of the tire, releasing said bands after stretching so they are free to contract while in loose and unrestrained condition, successively applying said bands to a tire shaping former before they have had time to contract a substantial amount, less than the size of said former, building bead portions at the side edges of the bands when said edges are contracted to bead diameter, completing the tire laminations by adding the covering rubber, and finally vulcanizing the tires in molds under internal expanding pressure acting to increase the size of the finished tires.

10. In a method of tire building, the steps of stretching all portions of an endless band of carcass material on a stretcher, simultaneously releasing all portions of the band from the stretching force, leaving it loose and in substantially flat cross sectional form while it readjusts itself and thereafter applying the band over a tire shaping former before it has had time to shrink to a size substantially less than the size of said former.

11. In a method of tire building, the steps of stretching all portions of an endless band of four or more plies of rubberized cord arranged at angles to the edges of the band and to each other on a stretcher, simultaneously releasing all portions of the band from the stretching force for a short period of readjustment of forces in the band while loose and in substantially flat cross sectional form, applying the band over a tire shaping former while still in its stretched condition and in the act of shrinking, applying beads to the edge portions of the band after such portions have contracted from their stretched condition and without otherwise disturbing such edge portions, completing the tire structure in its raw state and finally vulcanizing the tire structure under internal fluid pressure acting to stretch all portions of the tire above the bead edges.

12. In a method of tire building, the steps of stretching an endless band of carcass material in substantially flat form on a stretcher, simultaneously releasing all portions of the band from the stretcher, leaving said band loose for a short period of unrestrained readjustment, and subsequently centering the band over a tire shaping former while the band is still in the act of shrinking from its stretched condition.

13. In a method of cord tire building, the steps of successively and uniformly stretching all portions of elastic bands of carcass material to increase the size of the bands substantially from the bead circumference to the crown circumference, releasing the bands for a short period of readjustment, and successively applying such bands to a tire building former by centering thereon while still in stretched condition, then permitting said bands to shrink to approximately tire form, building the beads in the side edges of said bands while the said edges are substantially in the condition brought about by their shrinking action, whereby the carcass of the tire is built and formed substantially unrestrained except by the tire building former over which the carcass material is caused to shrink and the mere placing of the beads in the side edges, applying the covering rubber to such carcass, and finally finishing the tire by vulcanizing it under internal pressure acting to uniformly stretch the tire above the bead edges.

14. In a method of tire building, the steps of stretching annular carcass material in substantially flat cross section for application to a tire shaping former, centering said material on the former in stretched condition and conforming the material to a part of the former by the progressive shrinking operations of the side portions of said material and leaving the edge portions loose, incorporating bead members at the said edge portions leaving the edge portions still loose, completing the application of the tire material on the carcass, and bringing the raw tire thus built to its ultimate form for service by internal pressure in a closed vulcanizing mold of larger size than the tire as laid up on the former.

15. In a method of cord tire building, the steps of longitudinally stretching all portions of an endless band of multi-ply rubberized cord carcass material on a stretcher, releasing the band for an interval of self adjustment while the band is loose and in substantially flat cross sectional form, and then applying the loose band to a tire shaping former before the effect of the stretching forces in the band has been dissipated.

16. In a method of cord tire building, the steps of stretching all portions of a flat ring of elastic carcass material, then permitting it to shrink while loose and in substantially flat cross sectional form, and finally applying the loose band to a tire shaping former before the band has completed its shrinking action.

17. In a method of cord tire building on a tire shaping former the steps which consist in stretching an endless flat band of carcass material circumferentially in all its portions to increase its size from bead to crown circumference of the said former, in freeing the band from all external restraining means after it has been stretched and before it is applied to the said former, and thereafter centering and applying it to said former while loose and still in shrinking condition due to the stretching step, whereby the said band may be conveniently applied to said former under uniform tension conditions.

FRANKLIN G. NEAL.
DAVID F. LOGAN.